3,470,184
N-(3-PYRAZOLYL-PROPYL)-N'-PHENYL-
PIPERAZINES
Vishwa Prakash Arya, Bombay, India, assignor to Ciba
Limited, Basel, Switzerland, a company of Switzerland
No Drawing. Filed Dec. 22, 1966, Ser. No. 603,728
Claims priority, application Switzerland, Dec. 23, 1965,
17,732/65; Nov. 10, 1966, 16,258/66
Int. Cl. C07d 57/00; A61k 25/00
U.S. Cl. 260—268                               9 Claims

ABSTRACT OF THE DISCLOSURE

N - [(1 - Ac - 4 - pyr) - C(=X) - alk - CH$_2$] - N' - Ar-diazacycloalkanes in which the nitrogen atoms of the diazacycloalkane radical are separated from each other by 2 or 3 carbon atoms and in which the 4-pyr group is a 4-pyrazolyl radical substituted in position 1 by the group Ac which represents the acyl residue of an organic acid, X represents an oxygen atom, a free or substituted hydroxyl group together with a hydrogen atom, or two hydrogen atoms, or a double bond linked with the C$_1$ carbon atom of the residue "alk," in which "alk" represents a 1:1-lower alkylidene residue, together with a hydrogen atom, and Ar represents an aromatic group. The compounds are useful as antihypertensives.

---

The present invention provides, as new compounds, N - [(1 - Ac - 4 - pyr) - C(=X) - alk - CH$_2$] - N' - Ar-diazacycloalkanes in which the nitrogen atoms of the diazacycloalkane radical are separated from each other by 2 or 3 carbon atoms and in which the 4-pyr group is a 4-pyrazolyl radical substituted in position 1 by the group Ac which represents the acyl residue of an organic acid, X represents an oxygen atom, a free or substituted hydroxyl group together with a hydrogen atom, or two hydrogen atoms, or a double bond linked with the C$_1$ carbon atom of the residue "alk," in which "alk" represents a 1:1-lower alkylidene residue, together with a hydrogen atom, and Ar represents an aromatic group.

In the 1-Ac-4-pyrazolyl radical the acyl group Ac is above all the acyl residue of an organic carboxylic acid, especially a functionally modified carbonic acid, above all the acyl radical of an esterified carbonic acid, being for instance a carbo-lower alkoxy radical such, for example, as a carbomethoxy, carbethoxy, carbo-n-propoxy or carbo-n-butoxy radical, or the residue of an amidated carbonic acid, being for instance a carbamyl or N-lower alkylcarbamyl radical such, for example, as an N-monomethyl, N,N-dimethyl-, N-ethyl- or N,N-diethyl-carbamyl group.

The acyl radical Ac may also be the acyl radical of an aliphatic carboxylic acid, especially a lower alkane carboxylic acid which preferably contains 1 to 5 carbon atoms, for example, acetic, propionic, n-butyric, isobutyric or pivalic acid, or it may be the acyl radical of a cycloaliphatic acid, such, for example, as a cycloalkanecarboxylic acid which preferably contains 5 to 7 cyclic carbon atoms, for example cyclopentanecarboxylic or cyclohexanecarboxylic acid, or the acyl radical of an aromatic carboxylic acid such, for example, as benzoic acid, or of an araliphatic carboxylic acid such, for example, as phenylacetic acid, or of a heterocyclic carboxylic acid of aromatic character such, for example as nicotinic or isonicotinic acid.

The acyl radicals of the organic carboxylic acids may contain substituents. Those of aliphatic carboxylic acids may contain, for example, hydroxyl groups, lower alkoxy such, for example, as methoxy or ethoxy groups, halogen such as fluorine, chlorine or bromine atoms, or free or substituted amino groups, especially mono- or di-lower alkyl-amino groups, or alkylene-, oxaalkylene- or azaalkyleneimino groups, for example, monomethyl-, dimethyl-, monoethyl- or diethylamino groups, pyrrolidino, piperidino, morpholino, piperazino, N-lower alkyl-piperazino or N-β-hydroxy- lower alkyl-piperazino groups. The acyl radicals of cycloaliphatic carboxylic acids contain lower alkyl groups and those of aromatic, heterocyclic or araliphatic carboxylic acids contain lower alkyl, lower alkoxy, trifluoromethyl, nitro or amino groups or halogen atoms as substituents.

The new compounds may further contain in the pyrazole ring additional substituents, especially lower alkyl, phenyl or pyridyl groups, and these phenyl or pyridyl radicals may be substituted as indicated above. The pyrazole nucleus contains with advantage a lower alkyl group in the 5-position, for example one of the residues mentioned above, especially a methyl group.

A hydroxyl group in the 3-position of the propyl residue is advantageously a free hydroxyl group. A substituted hydroxyl group may be an etherified hydroxyl group, for example, one substituted by a lower aliphatic hydrocarbon residue, such, for example, as a lower alkyl or lower alkenyl group, being for example, a methyl, ethyl, propyl, isopropyl or allyl group. A substituted hydroxyl group may also be an esterified hydroxyl group, for example, a hydroxyl group esterified, for example, by amino-, lower alkyl-amino-, di-lower alkylamino- or lower alkoxy-formic acid or by a lower alkanecarboxylic acid, for example, one of the acids mentioned above.

The aromatic radical Ar is preferably a monocyclic or bicyclic residue, above all a phenyl or pyridyl residue which may be substituted, for example, as indicated above for the aryl radicals of the acyl residue of aromatic and heterocyclic acids.

The residue "alk" is a 1,1-lower alkylidene radical, for example a 1,1-ethylidene or 1,1-propylidene or above all a methylene radical.

Diazacycloalkane rings whose nitrogen atoms are separated from each other by 2 or 3 carbon atoms are above all the piperazine ring, or the 1,4-diazacycloheptane or 1,4-diazacyclooctane ring and their C-lower alkyl substituted derivatives, for example, 2-methylpiperazine or 2,6 - dimethylpiperazine, or 2 - methyl-1,4-diazacycloheptane.

The new compounds possess valuable pharmacological properties. Apart from displaying an adrenolytic effect they have above all also hypotensive and antihypertensive properties as can be demonstrated by animal tests, for example, on cats, dogs or rats. The new compounds may therefore be used as hypotensive or antihypertensive compounds pharmacologically or as medicaments. They may also be used as intermediate products in the manufacture of other valuable compounds, especially of pharmacologically active substances.

Compounds having especially valuable hypotensive properties are those of the formulae

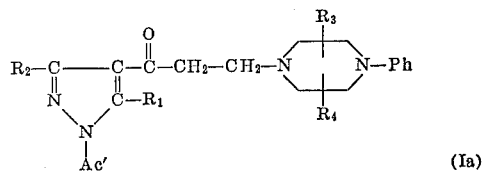

(Ia)

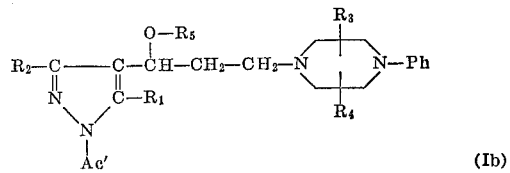

(Ib)

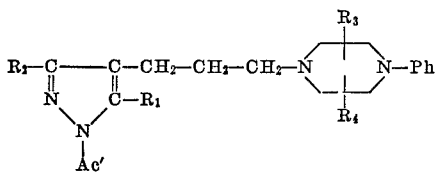

(Ic)

and

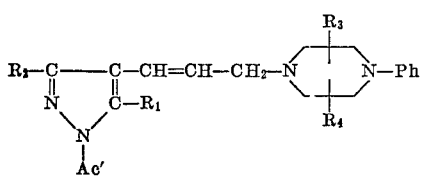

(Id)

in which R₁ represents a lower alkyl, especially a methyl, group; R₂ represents a lower alkyl group or preferably a hydrogen atom; Ac′ is the acyl residue of a functionally modified carbonic acid, especially the carbo-lower alkoxy group, or the acyl radical of a lower alkanecarboxylic acid; Ph represents an unsubstituted phenyl radical or a phenyl radical substituted by 1, 2 or more lower alkyl, lower alkoxy, trifluoromethyl groups and/or halogen atoms; R₃ and R₄ each represents especially a hydrogen atom or a lower alkyl group, especially a methyl group, and R₅ represents above all a hydrogen atom or a lower alkyl group, especially a methyl or ethyl group.

The compounds of the following formulae display a particularly valuable hypotensive effect:

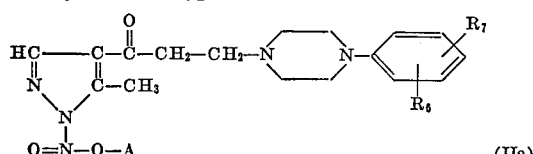

(IIa)

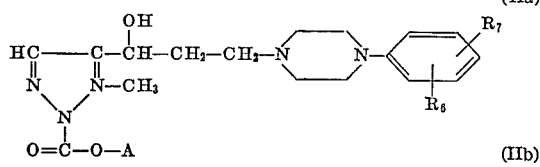

(IIb)

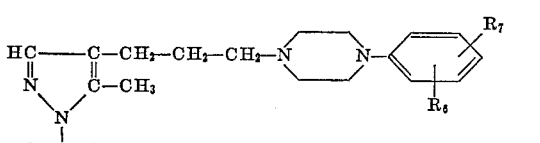

(IIc)

and

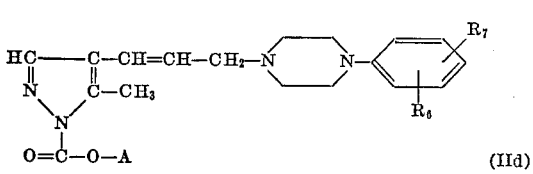

(IId)

in which A represent a lower alkyl group which preferably contains 1 to 5 carbon atoms, especially a methyl or ethyl group, and R₆ represents a methyl, ethyl, methoxy or trifluoromethyl group or a fluorine or chlorine atom, the methoxy group and the halogen atom preferably occupying the ortho or para position, whereas the trifluoromethyl group is in meta position, or a hydrogen atom; R₇ represents in the first place a hydrogen atom or is the same as R₆. Such compounds are more especially: N-[3-(1-carbethoxy-5-methyl - 4 - pyrazolyl) - 3 - oxopropyl] - N′ - (2-methylphenyl)-piperazine, N-[3-(1-carbethoxy-5-methyl - 4 - pyrazolyl)-3-oxo-propyl]-N′-(4-fluorophenyl)-piperazine and N - [3 - (1-carbethoxy-5-methyl-4-pyrazolyl)-3-hydroxypropyl] - N′ - (2-chlorophenyl)-piperazine. When these compounds are administered perorally or intervenously to rats, cats or dogs in a dose from 0.00025 to 0.01 gram per kg. of bodyweight, they produce very good hypotensive and adrenolytic effects.

The new compounds may be prepared by known methods, for example by reacting a 4-lower alkanoyl-1-Ac-pyrazole with formaldehyde and an N-unsubstituted N′-Ar-diazacycloalkane whose nitrogen atoms are separated from each other by 2 or 3 carbon atoms, or an amino compound which contains at least one hydrogen atom on the nitrogen atom and is capable of forming the N′-Ar-diazacyclocloalkane ring, and in a resulting compound containing a group convertible into the N′-Ar-diazacycloalkane ring this group is so converted; or reacting a 4-[Y-CH₂-alk-C(=X)]-1-Ac-pyrazole or a 4-[CH₂=alk′-C(=X)]-1-Ac-pyrazole, where Y is an eliminatable residue and alk′ represents a 1,1,1-lower alkylidyne group, with the above-mentioned N′-Ar-diazacycloalkane or with the amino compound and in a resulting compound containing a group convertible into the N′-Ar-diazacycloalkane ring the said group is so converted; or reductively replacing in an N-[(1-Ac-4-pyr)-C(=X)-alk-CH₂]-N′-Ar-diazacycloalkane, in which at least one of the methylene groups adjacent to the ring-azanitrogen atoms carries an oxo or a thiono group, the latter by 2 hydrogen atoms; or reacting an N-[(4-pyr′)-C(=X)-alk-CH₂]-N′-Ar-diazacycloalkane in which 4-pyr′ represents the 4-pyr residue unsubstituted in position 1, with an N-acylating agent; or reacting an N-[(acyl-formylmethyl)-C(=X)-alk-CH₂]-N′-Ar-diazacycloalkane, in which "acyl" represents the residue of an organic carboxylic acid, or an enol or enol derivative thereof with an N-Ac-hydrazine; or reducing in an N-[(1-Ac-4-pyr)-C(=X)-alk′-CH]-N′-Ar-diazacycloalkane the olefinic double bond, and, if desired or required, at any stage of the process converting the oxo group into a hydroxyl group, and/or, converting a hydroxyl group into a substituted hydroxyl group, and/or oxidizing a hydroxyl group to an oxo group or eliminating it, and/or introducing or reducing a double bond X linked with the C₁-carbon atom of the residue "alk," and/or, if desired, converting in a resulting compound a substituent into another, and/or eliminating substituents present or introducing substituents into resulting compounds, and/or, if desired, converting a resulting free base into a salt or a resulting salt into the free base or into another salt, and/or, if desired or required, resolving a resulting mixture of isomers into its constituent isomers.

The reaction of the starting material with formaldehyde and the N′-Ar-diazacycloalkane or the amino compound is carried out by the Mannich method. Apart from formaldehyde there may also be used a formaldehyde donor, for example, paraformaldehyde or dimethoxymethane, and, if desired or required, the reaction may be carried out in the presence of an acid. The N-Ar-diazacycloalkane or the amino compound is preferably used in the form of a salt thereof. The reaction is preferably conducted in the presence of a solvent, for example of an alcohol or dioxane. When a formaldehyde polymerization product is used, the reaction is preferably carried out in an organic solvent, such, for example, as one of those mentioned above, or in benzene, toluene, nitrobenzene or nitromethane. The reaction is preferably conducted at an elevated temperature, if desired under superatmospheric pressure and/or in an inert gas.

An eliminable group Y in a 4-[Y-CH₂-alk-C(=X)]-1-Ac-pyrazole is, for example, a reactively esterified hydroxyl group, such, for example, as a hydroxyl group esterified with a hydrohalic acid or sulphuric acid or with a strong organic sulphonic acid such, for example, as a benzenesulphonic or toluenesulphonic acid; preferably, it represents a halogen atom or an organic sulphonyloxy group such, for example, as a benzenesulphonyloxy group, for instance the para-toluene-sulphonyloxy group. It may also be a suitable carbonyloxy, for example, an acetyloxy- or ethoxycarbonyloxy group, or an N-unsubstituted or N-monosubstituted or N-polysubstituted amino group (in which case the starting material is advantageously used in the form of a salt thereof); X is in the first place an oxo group. A corresponding unsaturated 4-[$CH_2$=alk'-C(=X)]-1-Ac-pyrazole may also be formed in situ from the abovementioned 4-[Y-$CH_2$-alk-C(=X)]-1-Ac-pyrazole. The reaction of these starting materials with the N'-Ar-diazacycloalkane or the amino compound is carried out in the usual manner, preferably in the presence of an acid acceptor such, for example, as a basic condensing agent.

An amine compound, suitable for the formation of an N'-Ar-diazacycloalkane ring is, for example, ammonia or especially a primary or secondary amine whose substituents allow the cyclization with formation of an N'-Ar-diazacycloalkane ring. Such substituents are, for example, alkyl groups carrying in position β or γ an N-Ar-amino group containing at least one hydrogen atom or a free or reactive esterified hydroxyl group.

The formation of the N'-Ar-diazacycloalkane ring from a suitable substituent present in an intermediate obtainable according to the above procedure follows the usual practice. Thus, for example, a free amino group may be reacted with a reactive diester of a suitable N-Ar-N,N-bis-(hydroxyalkyl)-amine in which "alkyl" separates the hydroxy group from the aminonitrogen by 2 to 3 carbon atoms, and a diester is primarily one with the above acids, particularly hydrohalic acids, or with an N-Ar-oxa-azacycloalkane or an N-Ar-thiaazacycloalkane, in which the ring-nitrogen atom is separated from the oxa-oxygen or thia-sulfur atom by 2–3 carbon atoms, the latter preferably at an elevated temperature, if necessary, in a closed vessel under pressure to form the N'-Ar-diazacycloalkane ring. The amines mentioned above, which contain substituents on the nitrogen atom and which are suitable for forming the N'-Ar-diazacycloalkane ring, are also accessible by simultaneous or stepwise mono-substitution or di-substitution of a free amino compound with a reactive derivative of an alkanol that contains in the β- or γ-position an N-Ar-amino group with at least one hydrogen atom or a free or reactively esterified hydroxyl group, for example, with a reactive ester thereof or the corresponding epoxide. In a resulting secondary 3-(1-Ac-4-pyr)-3-X-propylamine compound containing a free hydroxyalkyl or a reactive esterified hydroxyalkyl group as substituent, a free hydroxyl group may, if necessary, first be converted into a reactive esterified hydroxyl group by a known method, for example, treatment with a sulphurous or phosphoriferous halide, especially thionylchloride, or with an organic sulphonylhalide, especially a sulphonylchloride, whereupon the resulting compound is treated with an N-Ar-amine and then with a reactive diester of a suitable alkanediol. In a resulting compound containing an amino group substituted by a secondary N-Ar-aminoalkyl radical and a hydroxyalkyl group the hydroxyl group may be converted by esterification into a reactive esterified hydroxyl group, whereupon the cyclization reaction is carried out.

In compounds containing an amino group with a 2-hydroxyalkyl radical the cyclization can be achieved by treatment with an N-Ar-amine, if necessary, after having converted the hydroxyl group into a reactive esterified hydroxyl group. A resulting di-(secondary aminoalkyl)-amino compound can be cyclized directly.

The reductive replacement of an oxo or thiono group by 2 hydrogen atoms follows the usual practice. A carbonyl group is converted into a methylene group, for example, by treating the starting material with a suitable light metal hydride reducing agent, for example, lithium-aluminium hydride, if necessary in the presence of an activator such, for example, as aluminium chloride, or with hydrogen in the presence of a suitable catalyst such, for example, as a copper-chromium catalyst, a thiocarbonyl group, for example, by treatment with a hydrogenating catalyst such, for example, as Raney nickel, in the presence of a suitable solvent such, for example, as ethanol. During this reaction any simultaneously reducible substituents, for example an oxo group X, may be reduced at the same time, for instance converted into a hydroxyl group.

An N - [(4-pyr')-C(=X)-alk-$CH_2$]-N'-Ar-diazacycloalkane, in which the 1-position of the 4-pyr' residue is unsubstituted is acylated in known manner, for example, by treatment with an organic acid halide, for example, acid chloride or anhydride, or with a ketene, if desired or required in the presence of a base such, for example, as pyridine or potassium carbonate, under superatmospheric pressure and/or in an inert gas. The N-acylation is advantageously performed with starting materials in which X represents an oxo group, two hydrogen atoms or a double bond, but may also stand for an etherified or esterified hydroxyl group together with a hydrogen atom.

The reaction of an N-Ac-hydrazine is preferably carried out with a suitable enol derivative, particularly a lower alkyl, e.g. methyl or ethyl ether of the N-[(acylformylmethyl)-C(=X)-alk-$CH_2$]-N'-Ar - diazacycloalkane; one may proceed stepwise, i.e. while forming a hydrazono intermediate, which may then be converted, for example, by heating into the desired product.

An olefinic double bond in an N-[1-Ac-4-pyr)-C(=X)-alk'=CH]-N'-diazacycloalkane is saturated, for example, by catalytic hydrogenation, such as treatment with hydrogen in the presence of a noble metal, such as a palladium catalyst, if necessary, under pressure. Simultaneously, other reducible groups in the molecule, such as an oxo group, may also be reduced.

The oxo group in a resulting compound is converted into a hydroxyl group in known manner at any stage of the process. Reduction with nascent hydrogen is advantageously performed, for example, by treatment with a metal such, for example, as sodium, in the presence of a hydrogen donor, such, for example, as an alcohol; complex metal hydrides, for example, sodium borohydride, or catalytically activated hydrogen, for example, in the presence of a platinum, palladium, nickel, copper or rhodium catalyst such, for example, as platinum oxide, palladium carbon, Raney nickel, copper chromite or rhodium on a support such, for example, as alumina or carbon, may likewise be used. The reduction is preferably performed in the presence of a solvent and/or with cooling, at room temperature or with heating, under atmospheric or superatmospheric pressure. It may also be performed according to the Meerwein-Ponndorf-Verley method, for example, by treatment with a lower alkanol such, for example, as isopropanol, in the presence of a suitable alcoholate, such, for example, as aluminium isopropylate.

The substitution of a free hydroxyl group in the 3-position of the propyl residue of a resulting compound, especially its etherification or esterification, is carried out in known manner. Thus, for example, there may be used diazo compounds such, for example, as diazo-lower alkanes, which are advantageously reacted in the presence of a suitable Lewis acid, for example, fluoboric acid, aluminium chloride, boron trifluoride etherate or an aluminium lower alkanoate; alternatively, a metal salt may be prepared and then reacted with a reactive ester of an alcohol; or the hydroxyl group may be reactively esterified, for example, converted into a halogen atom or into an organic sulphonyloxy group and then treated with an alcohol, preferably in the form of a metal compound; in this manner a compound is obtained which contains an etherified hydroxyl group. Esterification is preferably carried out by reaction with an acid halide, acid anhydride, ketene, isocyanate or isothiocyanate, if necessary or desired in the presence of a condensing agent such, for example, as a base capable of combining with acids.

If desired, a hydroxyl group X may be converted into an oxo group in known manner with a suitable oxidant such, for example, as a chromium-VI-compound. It may also be eliminated together with a hydrogen atom, if desired, after conversion into a suitably esterified hydroxyl group, for instance into a halogen atom, for example, by treatment with an acid agent such, for example, as a mineral acid, for example, hydrochloric acid, or with a basic agent, whereupon the unsaturated compound is obtained in which X represents a double bond, linked with the $C_1$ carbon atom, together with hydrogen; by reduction, for example with catalytically activated hydrogen, a hydroxyl group X may be eliminated directly with formation of the saturated compound in which X represents two hydrogen atoms.

A double bond X, linked with the $C_1$ carbon atom of the group "alk" can be saturated reductively, for example, by treatment with catalytically activated hydrogen. It may be introduced, for example, as described above, by elimination of a free or reactively esterified hydroxyl group together with hydrogen.

Furthermore, substituents present in resulting compounds may be converted into other substituents.

Thus, nitro groups may be subsequently reduced in the usual manner, for example by treatment with catalytically activated hydrogen, nascent hydrogen or with metal hydrides, such, as lithium aluminium hydride or sodium borohydride; this reduction may be carried out simultaneously with a reduction of the oxo group to the hydroxyl group.

The reactions of this invention are carried out in the usual manner, at room temperature or with cooling or heating, under atmospheric or superatmospheric pressure if necessary, in the presence or absence of diluents, catalysts and condensing agents.

Depending on the reaction conditions employed the new compounds are obtained in the free form or in the form of their salts. The latter are acid addition salts such, for example, as pharmaceutically useful acid addition salts, for example, salts with inorganic acid such, for example, as hydrochloric, hydrobromic, nitric, sulphuric or phosphoric acids, or with organic acids such, for example, as organic carboxylic acids, for example, acetic, propionic, glycollic, malonic, succinic, maleic, hydroxymaleic, dihydroxymaleic, fumaric, malic, tartaric, citric, benzoic, cinnamic, mandelic, salicyclic, 4-aminosalicyclic, 2-phenoxybenzoic, 2-acetoxy-benzoic, embonic, glucuronic, nicotinic or isonicotinic acid, or with organic sulphonic acids, for example, methanesulphonic, ethanesulphonic, 2-hydroxyethanesulphonic, 1,2-ethanedisulphonic, benzenesulphonic, para-toluenesulphonic or 2-naphthalenesulphonic acid. Other acid addition salts may also be used as intermediate products, for example, for purifying the free compounds or for the manufacture of other salts, as well as for identification purposes. Salts particularly suitable for the last-mentioned purpose are, for example, those with acid organic nitro compounds, for example picric, picrolonic or flavianic acid, or with metallic complex acids, for example, phosphotungstic, phosphomolybic, chloroplatinic acid or Reinecke acid. Either mono- salts or poly- salts may be formed.

A resulting salt may be converted into the free compound, for example, by treatment with a base such, for example, as an alkali or alkaline earth metal hydroxide or carbonate, or with ammonia or with suitable ion exchange resin.

A resulting salt may also be converted into another salt, for example, by treatment with an ion exchange resin or by reacting a salt with an inorganic acid with a metal salt, for example, a sodium, barium or silver salt of an acid, in a suitable solvent in which the inorganic compound formed is insoluble.

Free compounds may be converted into their acid addition salts, for example, by treatment with acids such, for example, as the acids mentioned above, for instance by treating a solution of the base in a suitable inert solvent or solvent mixture with an acid or a solution thereof, or with a suitable ion exchange resin. Salts may also be obtained in the form of their hydrates, or they may contain solvent of crystallization. Owing to the close relationship between the new compounds in the free form and in the form of their salts what has been said above and below with reference to the free compounds or the salts is in general applicable to the corresponding salts or free compounds respectively, circumstances permitting.

Mixtures of isomers may be resolved into their constituents by known methods. Thus, for example, resulting racemates may be resolved into the optically active d-forms and l-forms by crylstallization from optically active solvents, or by treating the racemic compounds with an optically active form of an acid, containing an asymmetric carbon atom, preferably in the presence of a suitable solvent. Particularly suitable optically active forms of acids are d-tartaric acid and l-tartaric acid, as well as the optically active forms of malic, mandelic, camphor-10-sulphonic or quinic acid. Resulting salts may be converted into other salts or into the free and optically active bases, and an optically active base may be converted into an acid addition salt by the methods referred to above.

The invention includes also any variant of the present process in which an intermediate obtained at any stage of the process is used as starting material and any remaining step or steps is or are carried out, or in which the process is discontinued at any stage thereof, or in which a starting material is formed under the reaction conditions or used in the form of a derivative, for example a salt, thereof.

The invention further includes any new compound formed an an intermediate product.

The starting materials to be used in the present process are advantageously those which give rise to the compounds referred to above as being specially valuable.

The starting materials are known or, insofar as they are new, they can be prepared by known methods. Thus, for example, 4-lower alkanoyl-1-Ac-pyrazoles are manufactured by reacting an N-Ac-hydrazine with a β-ethoxy-methylene-α,γ-dione compound and cyclization of a resulting hydrazone compound for example by heating. An N-[(4-pyr)-C(=X)-alk-$CH_2$]-N'-Ar - diazacycloalkane, in which the 1-position of the 4-pyrazolyl residue is unsubstituted, is accessible, for example, by subjecting a 1-$R_0$-4-lower alkanoyl-prazole, in which $R_0$ represents a substituent that can be replaced by hydrogen, to the Mannich reaction described above, replacing in a resulting N-[(1-$R_0$-4-pyr)-C(=O)-alk-$CH_2$]-N'-Ar - diazacycloalkane the group $R_0$ (which, for example, is a 1-phenylalkyl, such as a benzyl radical) by hydrogen, for example, by hydrogenolysis and, if desired or required, reducing the carbonyl group X and substituting a resulting hydroxyl group or reoxidizing it to the oxo group. A 1-acyl-3-[$H_2$N-$CH_2$-alk-C(=X)]-pyrazol is prepared, for example, according to the process modifications used for the manufacture of the final products, in which an amine suitable for the formation of the N-Ar-diazacycloalkane may be used instead of the N-Ar-diazacycloalkane; ammonia or an ammonia-furnishing reagent is used for the formation of the primary amine starting material. The N-[(acyl-formyl-methyl)-C(=X)-alk-$CH_2$]-N'-Ar - diazacycloalkane may be obtained, for example, by treatment of an N-[(acyl-methyl)-C(=X)-alk-$CH_2$]-N'-Ar - diazcycloalkane with a suitable derivative of formic acid or orthoformic acid, such as a lower alkyl ester, and, if necessary, converted into a suitable enol derivative according to known methods. An N-[(1-Ac-4-pyr)-C(=X)-alk'=CH] - N' - Ar-diazacycloalkane may be obtained, for example, by treatment of a 4-[OHC-alk-C(=X)]-1-Ac-pyrazole with an N-unsubstituted N'-Ar-diazacycloalkane, preferably in the presence of an acidic reagent, such as p-toluene sulfonic acid, with the formation of the desired enamine, or from a 1-Ac-4-[cyano-alk-C(=X)]-pyrazole by treatment with an N-unsubstituted N'-Ar-diazacycloalkane under reductive conditions, for example, while treating with hydrogen in the presence of Raney-nickel.

The compounds of the present invention may be used as pharmaceutical preparation which contain the compound in admixture or conjunction with an organic or inorganic, solid or liquid, pharmaceutically suitable carrier, the said pharmaceutical preparations being suitable for enteral, for example, oral, or parental administartion. Pharmaceutical preparations may be in solid form, for example tablets, dragees or capsules, or in liquid form, for example solutions, suspensions or emulsions. They contain the conventional excipients and possibly also further assistants, for example, preserving, stabilizing, wetting or emulsifying agents, salts for regulating the osmotic pressure, buffers, dyestuffs or flavouring materials. They are manufactured by known methods and may further contain additional therapeutically valuable substances.

The follow examples illustrate the invention:—

EXAMPLE 1

A mixture of 9.8 g. of 4-acetyl-1-carbethoxy-5-methylpyrazole and 4.5 g. of paraformaldehyde in 150 ml. of ethanol was treated with 12.5 g. of N-(2-methylphenyl)-piperazine dihydrochloride and 8 drops of concentrated hydrochloric acid and then refluxed overnight. On cooling, [3-(1-carbethoxy - 5 - methyl - 4 - pyrazolyl) - 3 - oxopropyl -N'-(2-methylphenyl)-piperazine hydrochloride of the formula

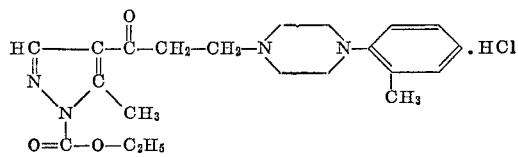

crystallized out. On recrystallization from methanol it melted at 214 to 215° C. with decomposition.

The starting material used above was prepared in the following manner:

A mixture of 120 g. of ethoxymethylene acetylacetone in 250 ml. of ether was cooled to 0° C. and then a solution of 80 g. of N-carbethoxyhydrazine in 750 ml. of ether was dropped in, which addition took 2 hours to complete, and the reaction mixture was then stirred for 8 hours at room temperature. The crystalline material was filtered off and recrystallized from a mixture of methanol and isopropanol. The hydrazone thus obtained melted at 140° C. 145 grams of this product were heated for 3 hours under nitrogen at 160° C.; after cooling to room temperature, the batch was diluted with 500 ml. of ether and the mixture was evaporated to dryness. The residue was recrystallized from ether, to yield 4-acetyl-1-carbethoxy-5-methyl-pyrazole which melted at 67° C. Its thiosemicarbazone melted at 212° C. and its guanylhydrazone hydrochloride at 206° C.

EXAMPLE 2

A mixture of 5.9 g. of 4-acetyl-1-carbethoxy-5-methylpyrazole and 2.7 g. of paraformaldehyde in 80 ml. of ethanol was treated with 7 g. of N-(2-chlorophenyl)-piperazine monohydrochloride and 5 drops of concentrated hydrochloric acid and then refluxed overnight. On cooling, N - [3 - (1 - carbethoxy - 5 - methyl - 4 - pyrazolyl)-3-oxo-propyl]-N'-(2-chlorophenyl)-piperazine hydrochloride of the formula

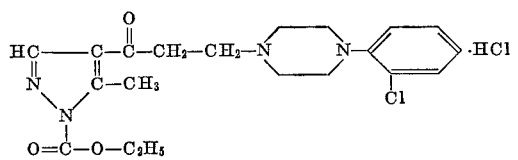

crystallized out. On recrystallization from methanol it melted at 215 to 216° C. with decomposition.

EXAMPLE 3

A mixture of 5.9 g. of 4-acetyl-1-carbethoxy-5-methylpyrazole and 2.7 g. of paraformaldehyde in 80 ml. of ethanol was treated with 7.6 g. of N-(4-fluorophenyl)-piperazine dihydrochloride and 5 drops of concentrated hydrochloric acid and then refluxed overnight. On cooling, N - [3 - (1 - carbethoxy - 5 - methyl - 4 - pyrazolyl) - 3-oxo-propyl]-N'-(4-fluorophenyl) - piperazine hydrochloride of the formula

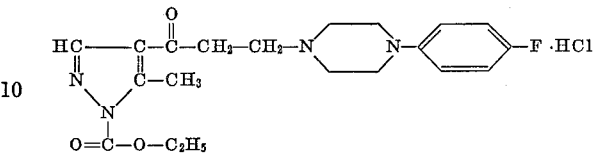

crystallized out. On recrystallization from methanol it melted at 215° C. with decomposition.

EXAMPLE 4

A mixture of 9.8 g. of 4-acetyl-1-carbethoxy-5-methylpyrazole and 4.5 g. of paraformaldehyde in 135 ml. of isopropanol was treated with 13.2 g. of N-(2-methoxyphenyl)-piperazine dihydrochloride and 10 drops of concentrated hydrochloric acid and then refluxed overnight. On cooling, N-[3-(1-carbethoxy-5-methyl-4-pyrazolyl)-3-oxo-propyl]-N'-(2-methoxyphenyl)-piperazine hydrochloride of the formula

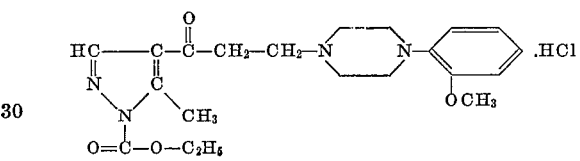

crystallized out. On recrystallization from methanol it melted at 202 to 203° C. with decomposition.

EXAMPLE 5

A mixture of 2.95 g. of 4-acetyl-1-carbethoxy-5-methylpyrazole and 2.7 g. of paraformaldehyde in 45 ml. of ethanol was treated with 3.9 g. of N-(2-ethylphenyl)-piperazine dihydrochloride and 3 drops of concentrated hydrochloric acid and then refluxed overnight. On cooling, N - [3 - (1 - carbethoxy - 5 - methyl - 4 - pyrazolyl)-3-oxo-propyl]-N'-(2-ethylphenyl)-piperazine hydrochloride of the formula

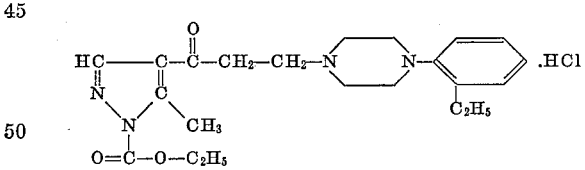

crystallized out. On recrystallization from ethanol it melted at 190° C. with decomposition.

EXAMPLE 6

A solution of 1.3 g. of N-[3-(1-carbethoxy-5-methyl-4-pyrazolyl) - 3 - oxo - propyl] - N' - (2 - chlorophenyl)-piperazine hydrochloride in 60 ml. of aqueous methanol of 50% strength was dropped into a solution of 0.13 g. of sodium borohydride in 40 ml. of methanol of 50% strength at room temperature. The reaction mixture was then stirred for 30 minutes at room temperature and for 2 hours at 45 to 50° C. and finally heated to the boil within 15 minutes.

The solvent was then evaporated and the residue taken up in ethyl acetate. The organic extract was dried over anhydrous sodium sulphate and evaporated to dryness. The residue, containing the N-[3-(1-carbethoxy-5-methyl-4 - pyrazolyl) - 3 - hydroxypropyl] - N' - (2 - chlorophenyl)-piperazine, was then dissolved in 20 ml. of chloroform and a solution of hydrochloric gas in isopropanol was added until a pH value of 2 was reached. The crystalline precipitate was recrystallized from a mixture of isopropanol and ether, to yield N-[3-(1-carbethoxy-5-methyl-4- pyrazolyl) - 3 - hydroxy - propyl] - N' - (2 - chlorophenyl)-piperazine dihydrochloride of the formula

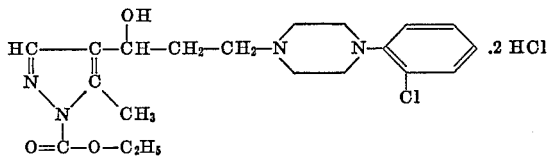

which melted at 175° C. with decomposition.

EXAMPLE 7

A mixture of 3.92 g. of 4-acetyl-1-carbethoxy-5-methylpyrazole and 1.8 g. of paraformaldehyde in 55 ml. of ethanol was treated with 5 g. of N-(4-methylphenyl)-piperazine dihydrochloride and 5 drops of concentrated hydrochloric acid and then refluxed overnight. On cooling, N - [3 - (1 - carbethoxy - 5 - methyl - 4 - pyrazolyl) - 3-oxo-propyl]-N'-(4-methylphenyl)-piperazine dihydrochloride of the formula

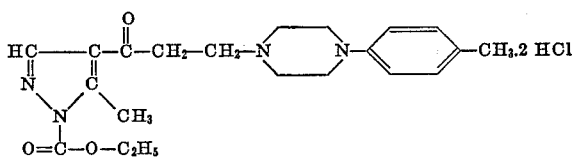

crystallized out. On recrystallization from methanol it melted at 195° C. with decomposition.

EXAMPLE 8

20 grams of N-[3-(1-carbethoxy-5-methyl-4-pyrazolyl)-3-oxo-propyl]-N'-(2-methylphenyl)-piperazine hydrochloride were intimately mixed with 130 g. of maize starch. A paste was prepared from 30 g. of maize starch and 100 g. of distilled water and added to the above mixture, and the whole was then thoroughly kneaded, granulated and dried at 45° C. A mixture of 14 g. of talcum and 6 g. of magnesium stearate was added to the granulate, the whole was thoroughly mixed and then pressed into tablets each containing 0.01 g. or 0.05 g. of the active substance.

EXAMPLE 9

A mixture of 5.88 g. of 4-acetyl-1-carbethoxy-5-methylpyrazole and 2.7 g. of paraformaldehyde in 80 ml. of ethanol was mixed with 7.02 g. of N-(3-chlorophenyl)-piperazine dihydrochloride and 10 drops of concentrated hydrochloric acid and then refluxed for 16 hours. On cooling, N-[3-(1-carbethoxy-5-methyl-4-pyrazolyl)-3-oxo-propyl]-N'-(3-chlorophenyl)-piperazine hydrochloride of the formula

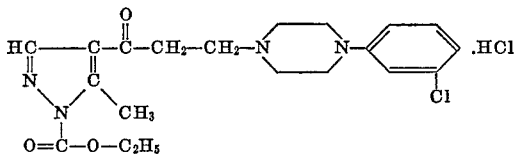

crystallized out. On recrystallization from a mixture of methanol and isopropanol it melted at 205° C. with decomposition.

EXAMPLE 10

A mixture of 5.88 g. of 4-acetyl-1-carbethoxy-5-methylpyrazole and 2.7 g. of paraformaldehyde in 80 ml. of absolute ethanol was treated with 7.08 g. of N-(2-pyridyl)-piperazine dihydrochloride and 10 drops of concentrated hydrochloric acid and then refluxed for 16 hours. The mixture was evaporated to dryness and the residue dissolved in water. The aqueous solution was made basic with a saturated aqueous solution of sodium carbonate and then extracted with ethyl acetate. The organic extract was dried over anhydrous sodium sulphate and evaporated to dryness. The residue was dissolved in 10 ml. of isopropanol and treated with an ethreal maleic acid solution, to yield as a crystalline precipitate N-[3-(1-carbethoxy - 5 - methyl - 4 - pyrazolyl) - 3 - oxo - propyl]-N'-(3-pyridyl)-piperazine maleate of the formula

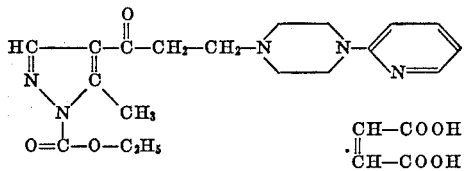

which melts at 170° C. after recrystallization from methanol.

EXAMPLE 11

A mixture of 5.8 g. of 4-acetyl-1-carbethoxy-5-methylpyrazole and 2.7 g. of paraformaldehyde in 80 ml. of absolute ethanol was refluxed for 16 hours with 9.03 g. of N-(3-trifluoromethylphenyl)-piperazine dihydrochloride and 10 drops of concentrated hydrochloric acid. On cooling, N-[3-(1-carbethoxy-5-methyl-4-pyrazolyl)-3-oxo-propyl]-N'-(3-trifluoromethylphenyl)-piperazine hydrochloride of the formula

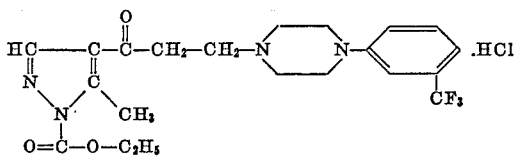

crystallized out. On recrystallization from a mixture of methanol and isopropanol it melated at 190 to 191° C. with decomposition.

EXAMPLE 12

A mixture of 5.88 g. of 4-acetyl-1-carbethoxy-5-methylpyrazole and 2.7 g. of paraformaldehyde in 75 ml. of absolute ethanol was treated with 8.1 g. of N-(4-chlorophenyl)-piperazine dihydrochloride and 10 drops of concentrated hydrochloric acid and then refluxed for 16 hours. On cooling, N-[3-(1-carbethoxy-5-methyl-4-pyrazolyl)-3-oxo-propyl]-N'-(4-chlorophenyl)-piperazine hydrochloride of the formula

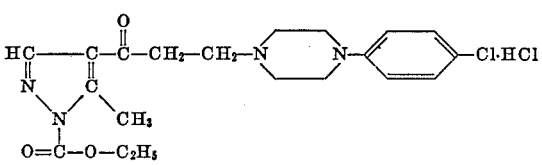

crystallized out. On recrystallization from a mixture of methanol, isopropanol and ether it melted at 196 to 197° C. with decomposition.

EXAMPLE 13

A mixture of 1.37 g. of 4-acetyl-1-carbethoxy-5-methyl-pyrazole and 0.63 g. of paraformaldehyde in 25 ml. of absolute ethanol was refluxed for 16 hours with 1.65 g. of N-(4-pyridyl)-piperazine dihydrochloride and 2 drops of concentrated hydrochloric acid. The reaction mixture was then filtered and the filtrate evaporated to dryness. The residue was dissolved in 2 ml. of isopropanol and treated with an ethereal solution of maleic acid. The crystalline precipitate formed, the N-[3-(1-carbethoxy-5-methyl - 4 - pyrazolyl) - 3 - oxo - propyl] - N - (4 - pyridyl)-piperazine maleate of the formula

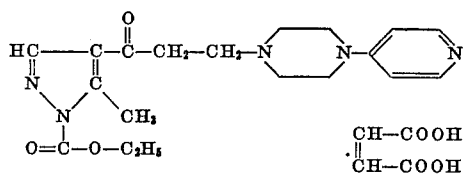

melted at 176° to 177° C. after recrystallization from a mixture of methanol, isopropanol and ether.

EXAMPLE 14

A mixture of 3.9 g. of 4-acetyl-1-carbethoxy-5-phenyl-pyrazole and 2.7 g. of paraformaldehyde in 80 ml. of absolute ethanol was treated with 7.59 g. of N-(2-fluorophenyl)-piperazine dihydrochloride and 10 drops of concentrated hydrochloric acid and then refluxed for 16 hours. On cooling, crystalline N-[3-(1-carbethoxy-5-methyl - 4 - pyrazolyl) - 3 - oxo - propyl] - N' - (2 - fluorophenyl)-piperazine hydrochloride of the formula

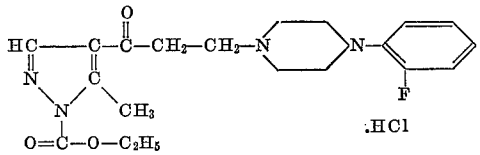

was obtained which on recrystallization from a mixture of methanol and isopropanol melted at 209° C. with decomposition.

EXAMPLE 15

A mixture of 3.9 g. of 4-acetyl-1-carbethoxy-5-phenyl-pyrazole and 1.35 g. of paraformaldehyde in 50 ml. of absolute ethanol was treated with 3.8 g. of N-(4-fluorophenyl)-piperazine dihydrochloride and 3 drops of concentrated hydrochloric acid and then refluxed for 16 hours. The reaction mixture was evaporated to dryness and the residue dissolved in water. The aqueous solution was made basic with a saturated sodium carbonate solution and extracted with ethyl acetate. The organic extract was dried over anhydrous sodium sulphate and evaporated to dryness. The residue was dissolved in 5 ml. of isopropanol and treated with an ethereal solution of maleic acid, to yield crystalline N-[3-(1-carbethoxy-5-phenyl - 4 - pyrazolyl) - 3 - oxo - propyl] - N' - (4 - fluorophenyl)-piperazine maleate dihydrate of the formula

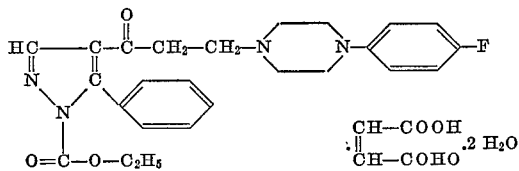

which on recrystallization from a mixture of isopropanol, methanol and ether melted at 153 to 154° C.

The starting material was prepared in the following manner:

A solution of 43.6 g. of ethoxymethylene benzoylacetone in 500 ml. of ether was cooled to 0° C. and 20.8 g. of N-carbethoxyhydrazine in 600 ml. of ether were added portionwise; this addition took 4 hours. The reaction mixture was then stirred for 18 hours at room temperature. The crystalline material was filtered off and recrystallized from a mixture of methylene chloride and hexane. The resulting hydrazone compound melted at 126–127° C.

38 g. of the above hydrazone compound were heated for 6 hours at 160° C. under nitrogen. After cooling to room temperature the product was dissolved in ether and the solution dried over anhydrous sodium sulphate. The batch was evaporated and the residue chromatographed on an alumina column. The fraction eluted with a 1:2-mixture of benzene and hexane represented the 4-acetyl-1-carbethoxy-5-phenyl-pyrazole which after recrystallization from a mixture of ether and hexane melted at 113 to 114° C. Benzene eluted the 4-benzoyl-1-carbethoxy-5-methylpyrazole melting at 79 to 82° C.

EXAMPLE 16

A mixture of 5.88 g. of 4-acetyl-1-carbethoxy-5-methyl-pyrazole and 2.7 g. of paraformaldehyde in 80 ml. of absolute ethanol was heated with 9 g. of N-(2-trifluoromethylphenyl)-piperazine dihydrochloride and 10 drops of concentrated hydrochloric acid. On cooling, N-[3-(1-carbethoxy-5-methyl - 4 - pyrazolyl)-3-oxo-propyl]-N'-(2- trifluoromethylphenyl)-piperazine hydrochloride of the formula

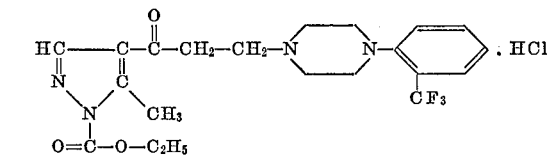

crystallized out. On recrystallization from a mixture of methanol, isopropanol and ether it melted at 198° C. with decomposition.

EXAMPLE 17

A solution of 4.07 g. of N-[3-(1-carbethoxy-5-methyl-4-pyrazolyl) - 3 - hydroxypropyl]-N'-(2 - chlorophenyl)-piperazine in 30 ml. of anhydrous benzene was treated with 3.57 g. of thionylchloride in 20 ml. of anhydrous benzene, and the reaction mixture was refluxed for 2 hours. The excess thionylchloride was removed by distillation under reduced pressure and the residue was treated with 0.2 N-sodium ethoxide solution in 100 ml. of ethanol while cooling to 10° C. The reaction mixture was refluxed for 2 hours, then evaporated to dryness and the residue dissolved in ether, dried and the solution was evaporated. The residue was chromatographed on an alumina column, and the fraction eluted with a 1:1-mixture of benzene and ether was treated with an ethereal maleic acid solution. The crystalline precipitate of N-[3-(1-carbethoxy-5-methyl-4-pyrazolyl)-3-ethoxy-propyl]-N' - (2 - chlorophenyl)-piperazine maleate monohydrate of the formula

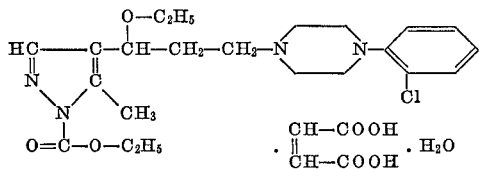

was filtered off. The product melted on recrystallization from a mixture of methanol, isopropanol and ether at 155 to 156° C.

EXAMPLE 18

A mixture of 1.97 g. of N-[3-(5-methyl-4-pyrazolyl)-3-oxo-propyl]-N'-(2 - methylphenyl)-piperazine hydrochloride, 0.55 g. of chlorethyl carbonate and 1 g. of sodium bicarbonate in 30 ml. of ethanol was refluxed for 4 hours. After cooling, the inorganic matter was filtered off and the filtrate evaporated to dryness. The residue was dissolved in water and the solution was rendered basic with a saturated sodium carbonate solution. The liberated base was extracted with ethyl acetate, dried and evaporated to dryness. The residue was taken up in isopropanol and treated with a 2.5 N-solution of hydrochloric gas in isopropanol. The crystalline precipitate was filtered off and recrystallized from methanol, to yield N-[3-(1-carbethoxy-5-methyl - 4-pyrazolyl) - 3 - oxo - propyl]-N'-(2-methylphenyl)-piperazine hydrochloride which melted at 214 to 215° C. with decomposition and was identical with the product described in Example 1.

The starting material was prepared thus:

A solution of 5 g. of N-[3-(1-carbethoxy-5-methyl-4-pyrazolyl) - 3 - oxo - propyl]-N'-(2-methylphenyl)-piperazine in 80 ml. of a 3 N-solution of hydrochloric gas in ethanol was refluxed for 16 hours. After cooling, the crystalline material was filtered off and the filtrate evaporated to dryness. The residue was dissolved in 20 ml. of absolute ethanol and adjusted to pH 2 with a 2 N-solution of sodium ethoxide in ethanol. The sodium chloride was filtered off the suspension, the filtrate evaporated and the residue dissolved in anhydrous ether. The solution was treated with dry hydrochloric gas in ethanol, to yield a crystalline precipitate of N-[3-(5-methyl - 4 - pyrazolyl)- 3 - oxo - propyl] - N' - (2-methylphenyl)-piperazine hydrochloride which melted at 198 to 200° C. with decomposition after recrystallization from a mixture of methanol, isopropanol and dry ether.

The starting material was also prepared by hydrogenating a mixture of N-[3-(1 - benzyl - 5-methyl-4-pyrazolyl)-3 - oxo - propyl]-N'-(2-methylphenyl)-piperazine (in the form of its hydrochloride salt) and methanol in the presence of a palladium carbon catalyst of 10% strength at room temperature under a pressure of about 3 atmospheres (gauge). The above-mentioned intermediate product is accessible in the following manner: 16.3 grams of ethoxymethylene acetylacetone in 200 ml. of ether are cooled to 0° C. and a solution of 12.8 g. of benzylhydrazine in 400 ml. of ether is dropped in at 10° C. The reaction mixture is stirred for 18 hours at room temperature and then evaporated to dryness. The residue is crystallized from a mixture of ether and hexane at 10° C., to yield 1 - benzyl - 4 - acetyl-5-methyl-pyrazole melting at 82 to 84° C. When a mixture of this product and paraformaldehyde in ethanol is treated with N - (2 - methylphenyl)-piperazine dihydrochloride and a small quantity of hydrochloric acid, the desired N-[3-(1-benzyl-5-methyl - 4 - pyrazolyl) - 3 - oxo-propyl]-N'-(2-methylphenyl)-piperazine is obtained in the form of a hydrochloride salt.

EXAMPLE 19

A solution of 0.9 g. of N-[3-(5-methyl-4-pyrazolyl)-3-oxo-propyl]-N'-(2-methylphenyl)-piperazine in 30 ml. of ethyl acetate was treated with a solution of 1 g. of benzoylchloride in 70 ml. of ether and then stirred for 24 hours at room temperature. The crystalline precipitate was filtered off and recrystallized from a mixture of isopropanol and ether, to yield N-[3-(1-benzoyl-5-methyl-4-pyrazolyl)-3-oxo-propyl]-N'-(2-methylphenyl)-piperazine hydrochloride of the formula

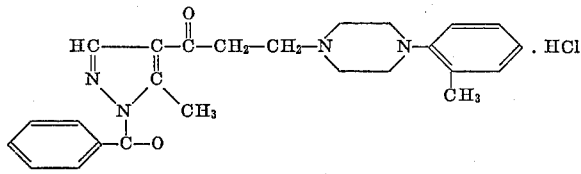

which melted at 188° C. with decomposition.

EXAMPLE 20

A mixture of 5.88 g. of 4-acetyl-1-carbethoxy-5-methyl-pyrazole and 2.7 g. of paraformaldehyde in 100 ml. of ethanol was treated with 8.4 g. of N-(3-chloro-4-methylphenyl)-piperazine dihydrochloride and 10 drops of concentrated hydrochloric acid and then refluxed for 16 hours. On cooling, N-[3-(1-carbethoxy-5-methyl-4-pyrazolyl)-3-oxo-propyl]-N'-(3-chloro-4-methyl-phenyl)-piperazine hydrochloride of the formula

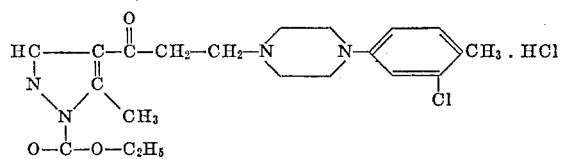

crystallized out. On recrystallization from a mixture of isopropanol and ether it melted at 200° C. with decomposition. The base could be liberated from the salt by treatment with a sodium hydroxide solution.

EXAMPLE 21

A solution of 1.68 g. of N-[3-(1-carbethoxy-5-methyl-4 - pyrazolyl) - 3-hydroxy-propyl]-N'-(2-chlorophenyl)-piperazine in 50 ml. of ethanol of 95% strength was saturated with hydrochloric gas and then refluxed for 3 hours. The reaction mixture was evaporated to dryness and the residue, containing the N-[3-(5-methyl-4-pyrazolyl)-2-propenyl]-N'-(2-chlorophenyl)-piperazine in the form of a hydrochloride salt, was dissolved in 30 ml. of absolute ethanol. This solution was treated with 1.2 g. of sodium bicarbonate and 0.65 g. of chlorethyl carbonate and refluxed for 4 hours. After cooling, the inorganic precipitate was filtered off and the filtrate evaporated to dryness. The residue, containing the N-[3-(1-carbethoxy - 5 - methyl-4-pyrazolyl)-2-propenyl]N'-(2-chlorophenyl)-piperazine of the formula

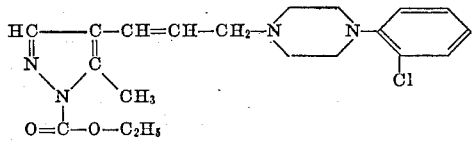

was dissolved in 40 ml. of methanol and hydrogenated in the presence of 0.7 g. of palladium carbon of 10% strength until the calculated quantity of hydrogen had been absorbed. The batch was filtered, the filtrate evaporated to dryness and the residue dissolved in isopropanol. Treatment with an ethereal solution of maleic acid furnished N - [3 - (1-carbethoxy-5-methyl-4-pyrazolyl)-3-propyl]-N'-(2-chlorophenyl)-piperazine maleate of the formula

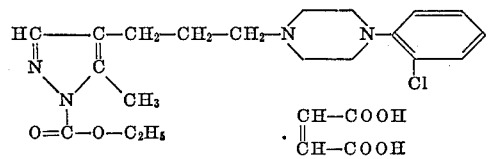

melting at 120 to 122° C.

EXAMPLE 22

A solution of 1.68 g. of N-[3-(1-carbethoxy-5-methyl-4 - pyrazolyl) - 3-hydroxy-propyl]-N'-(2-chlorophenyl)-piperazine in 50 ml. of chloroform is treated with 1.58 g. of acetyl chloride and the reaction mixture is stirred for 16 hours at room temperature. The solvent is evaporated off; the residue contains N-[3-acetyloxy-3-(1-carbethoxy - 5 - methyl-4-pyrazolyl)-propyl]-N'-(2-chlorophenyl)-piperazine hydrochloride of the formula

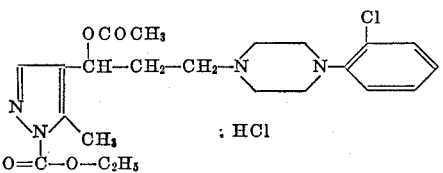

which in the infrared absorption spectrum shows a band at 1710 cm.$^{-1}$, characteristic of the acetyloxy group and a band at 1735 cm.$^{-1}$ characteristic for the carbethoxy group.

EXAMPLE 23

A mixture of 5.89 g. of 4-acetyl-1-carbethoxy-5-methyl-pyrazolyl and 2.7 g. of paraformaldehyde in 80 ml. of ethanol is treated with 7.5 g. 2-methyl-1-phenyl-piperazine dihydrochloride and 10 drops of concentrated hydrochloric acid and refluxed for 16 hours. The mixture is evaporated to dryness and the residue is dissolved in water; the solution is basified with a saturated aqueous sodium carbonate solution and extracted with ethyl acetate. The organic extract is dried over anhydrous sodium sulfate and evaporated; the residue containing the 1-[3-(1 - carbethoxy - 5-methyl-4-pyrazolyl)-3-oxo-propyl]-3-methyl-4-phenyl-piperazine of the formula

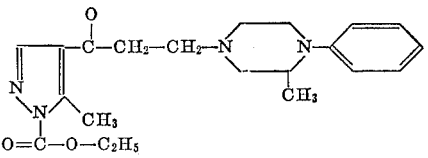

shows in the infrared absorption spectrum a characteristic band at 1668 cm.⁻¹ and is soluble in 2 N hydrochloric acid.

EXAMPLE 24

A mixture of 1.18 g. of 4-acetyl-1-carbethoxy-5-methyl-pyrazole and 0.6 g. of paraformaldehyde in 20 ml. of ethanol is treated with 1.5 g. of 1-(4-fluoro-phenyl)-2-methyl-1,4-diazacycloheptane dihydrochloride and refluxed for 16 hours. The reaction mixture is worked up as described in Example 23; the basic residue contains the 1 - [3 - (1-carbethoxy-5-methyl-4-pyrazolyl)-3-oxo - propyl]-4-(4-fluoro-phenyl)-3-methyl-1,4-diazacycloheptan of the formula

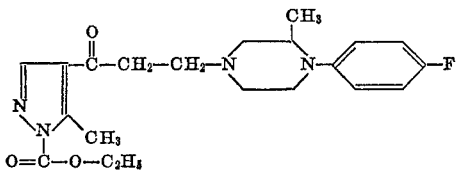

and shows in the infrared absorption spectrum a characteristic band at 1665 cm.⁻¹.

What is claimed is:

1. A member selected from the group of a compound having one of the formulae

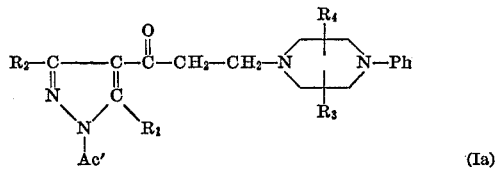

and

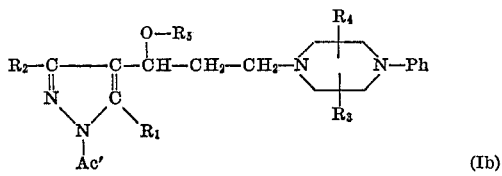

in which $R_1$ is lower alkyl, $R_2$ is a member selected from the group consisting of lower alkyl and hydrogen, Ac′ is a member selected from the group consisting of carbo-lower alkoxy and lower alkanoyl, Ph is a member selected from the group consisting of unsubstituted phenyl and phenyl substituted by up to two substituents selected from lower alkyl of one to three carbon atoms, lower alkoxy, trifluoromethyl and halogeno, $R_3$ and $R_4$ each is a member selected from the group consisting of hydrogen and lower alkyl, and $R_5$ is a member selected from the group consisting of hydrogen and lower alkyl, and the pharmaceutically useful acid addition salts thereof.

2. A compound as claimed in claim 1 and is a member selected from the group consisting of a compound having one of the formulae given in claim 1, in which $R_1$ is a methyl group, $R_2$ is a hydrogen atom, Ac′ is carbo-lower alkoxy, $R_3$ and $R_4$ each is a member selected from the group consisting of hydrogen and methyl, and $R_5$ is a member selected from the group consisting of hydrogen, methyl and ethyl, and Ph has the meaning given in claim 1, and a pharmaceutically useful acid addition salt thereof.

3. A compound as claimed in claim 1 and is a member selected from the group consisting of a compound having one of the formulae given in claim 1, wherein $R_1$, $R_2$ and Ac′ have the meaning given in claim 2, Ph has the meaning given in claim 1 and each of the groups $R_3$, $R_4$ and $R_5$ represents hydrogen, and a pharmaceutically useful acid addition salt thereof.

4. A compound as claimed in claim 1 and is a member selected from the group consisting of a compound having one of the formulae

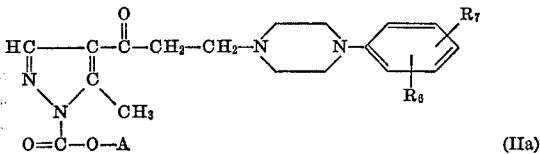

and

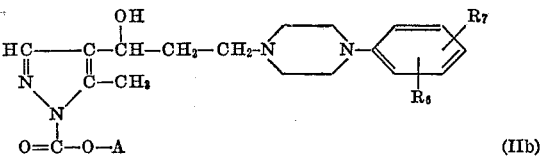

in which A is lower alkyl, and $R_6$ and $R_7$ each is a member selected from the group consisting of hydrogen, methyl, ethyl, methoxy, trifluoromethyl, fluoro and chloro, and a pharmaceutically useful acid addition salt thereof.

5. A compound as claimed in claim 1 and is a member selected from the group consisting of a compound having one of the formula given in claim 4, in which $R_6$ is a member selected from the group consisting of hydrogen, methyl, ethyl, methoxy trifluoromethyl, fluoro or chloro $R_7$ is hydrogen, and A is a member selected from the group consisting of methyl and ethyl.

6. A compound as claimed in claim 1 and being a member selected from the group consisting of N-[3-(1-carbethoxy-5-methyl-4-pyrazolyl) - 3 - oxo - propyl] - N′-(2-methylphenyl)-piperazine and a pharmaceutically useful acid addition salt thereof.

7. A compound as claimed in claim 1 and being a member selected from the group consisting of N-[3-(1-carbethoxy - 5 - methyl - 4 - pyrazolyl)-3-oxo-propyl]-N′-(4-fluorophenyl)-piperazine and a pharmaceutically useful acid addition salt thereof.

8. A compound as claimed in claim 1 and being a member selected from the group consisting of N-[3-(1-carbethoxy - 5 - methyl - pyrazolyl) - 3 - hydroxy-propyl]-N′-(2-chlorophenyl)-piperazine and a pharmaceutically useful acid addition salt thereof.

9. A compound as claimed in claim 1 and being a member selected from the group consisting of N-[3-(1-carbethoxy - 5 - methyl - 4 - pyrazolyl)-3-oxo-propyl]-N′-(3-chlorophenyl)-piperazine and a pharmaceutically useful acid addition salt thereof.

References Cited

UNITED STATES PATENTS

| | | | |
|---|---|---|---|
| 3,367,936 | 2/1968 | Koppe et al. | 260—268 |
| 3,329,680 | 7/1967 | Hofmann | 260—268 |
| 3,107,261 | 10/1963 | Gerber | 260—453 |

ALEX MAZEL, Primary Examiner

D. A. DAUS, Assistant Examiner

U.S. Cl. X.R.

260—174, 240, 247.2, 310, 471, 453, 454, 543, 544, 545, 561, 585.5, 594, 689, 690; 424—232, 250